United States Patent [19]

Divinsky et al.

[11] Patent Number: 5,430,658

[45] Date of Patent: Jul. 4, 1995

[54] METHOD FOR CREATING SELF-GENERATING EMBROIDERY PATTERN

[75] Inventors: Aaron M. Divinsky, Mississauga; Brian J. Goldberg, Thornhill; Alexander Nicolaou, Mississauga; Anastasios Tsonis, Village of Conestogo, all of Canada

[73] Assignee: Pulse Microsystems, Ltd., Mississauga, Canada

[21] Appl. No.: 131,142

[22] Filed: Oct. 4, 1993

[51] Int. Cl.$^6$ .................. G06F 15/46; D05B 21/00
[52] U.S. Cl. .................. 364/470; 112/475.05; 112/475.19
[58] Field of Search .................. 364/470; 112/121.11, 112/121.12, 121.13, 266.1, 447, 453, 454, 456–458

[56] References Cited

U.S. PATENT DOCUMENTS

| | | |
|---|---|---|
| 4,149,246 | 4/1979 | Goldman. |
| 4,227,472 | 10/1980 | Bergvall. |
| 4,326,473 | 4/1982 | Kigawa. |
| 4,352,334 | 10/1982 | Childs et al. ............ 112/266.1 |
| 4,720,795 | 1/1988 | Kinoshita et al. ............ 112/121.12 |
| 4,807,143 | 2/1989 | Matsuura ............ 364/470 |
| 4,821,662 | 4/1989 | Pongrass et al. ............ 112/266.1 |
| 4,849,902 | 7/1989 | Yokoe et al. ............ 364/470 |
| 4,919,062 | 4/1990 | Yokoe et al. ............ 112/121.12 |
| 5,056,444 | 10/1991 | Lowry et al.. |
| 5,191,536 | 3/1993 | Komuro et al. ............ 364/470 |

FOREIGN PATENT DOCUMENTS

| | | |
|---|---|---|
| 4017177A1 | 12/1990 | Germany. |
| 4101123A1 | 7/1991 | Germany. |
| 4104320A1 | 8/1991 | Germany. |
| 4105089A1 | 8/1991 | Germany. |
| 4139203A1 | 7/1992 | Germany. |
| 3-221090 | 9/1991 | Japan .................. 364/470 |

OTHER PUBLICATIONS

Computer Graphics: Principles and Practice, 2nd Ed., p. 1020.
The Science of Fractal Images, Springer-Verlage, NY 1988 "A Unified Approach to Fractal Curves and Plants", by Saupe, pp. 273–298.

Primary Examiner—Roy N. Envall, Jr.
Assistant Examiner—Steven R. Garland
Attorney, Agent, or Firm—David M. Klein; Bryan Cave

[57] ABSTRACT

A method for creating a self-generating embroidery design pattern, which may be provided alone or merged with an existing pattern comprising the steps of defining a predetermined fractal shape having an associated axiom and production rules; parsing the axiom and production rules associated with the defined fractal shape and performing the production rules a selectable predetermined number of times for providing a plurality of stitch or outline points in accordance with a desired finished embroidery design pattern size, the stitch points being in either an outline data format or a stitch data format; converting the outline data format into a stitch data format; and translating the stitch data format into a predetermined embroidery language machine code for controlling an associated embroidery machine responsive to the predetermined embroidery language machine code.

11 Claims, 2 Drawing Sheets

METHOD FOR CREATING SELF-GENERATING EMBROIDERY PATTERN

FIELD OF THE INVENTION

The present invention relates to the creation of embroidery patterns for controlling embroidery machines and more particularly for creating self-generating embroidery design patterns which can be translated into embroidery machine language code for controlling such embroidery machines.

BACKGROUND OF THE INVENTION

Embroidery machines are generally controlled by programs. Generally, a separate program is required for each embroidery design. There are very few methods available which provide the ability to modify existing embroidery design programs, with such prior art systems, by way of example, consisting of systems which vary the parameters associated with a stitch pattern design in order to control stitching machinery, such as disclosed in U.S. Pat. Nos. 4,326,473; 4,821,662; 4,720,795; 4,352,334; 5,191,536; 4,807,143; 4,849,902. Some of these prior art systems are capable of scaling pattern sizes or making other modifications to existing pattern designs either input by the user or stored in memory. However, none of the prior art systems known to applicants is capable of creating a self-generating embroidery design pattern based on fractal geometry in which the user need only select the desired basic fractal shape, such as the von Koch snowflake, by way of example, and the desired number of repeats, nor such a system in which the self-generated pattern can be readily merged with an existing embroidery design pattern in an outline data format to provide the resultant embroidery machine pattern control codes for the embroidery machine. This is so despite the fact that fractal geometry per se is well known, such as described in *Computer Graphics: Principles and Practice*, 2nd Ed., at page 1020, and in an article entitled "A Unified Approach to Fractal Curves and Plants", by Dietmar Saupe, at pages 273–286 of *The Science of Fractal Images*, Springer-Verlage, New York 1988. Moreover, although our prior U.S. Pat. No. 5,270,939, entitled "Method for Modifying Embroidery Design Programs", issued Dec. 14, 1993, naming Brian Jeffrey Goldberg and Anastasios Tsonis as joint inventors thereof, the contents of which are specifically incorporated by reference herein in its entirety, discloses an efficient method for converting stitch data for embroidery design programs into condensed outline data which may be edited, modified and then converted back to stitch data, it does not provide the ability to create self-generating patterns based on fractal geometry which further enhances the flexability and utility of the embroidery machines which are being controlled.

DETAILED DESCRIPTION OF THE INVENTION

Figure 2:
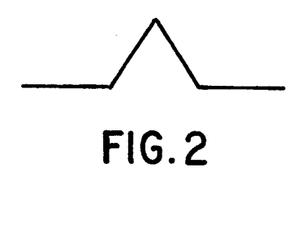
FIG. 2 and 4–5 are diagrammatic illustrations of an example of a typical fractal shape, such as the von Koch snowflake, usable in accordance with the presently preferred method of the present invention.
Figures 4, 5:
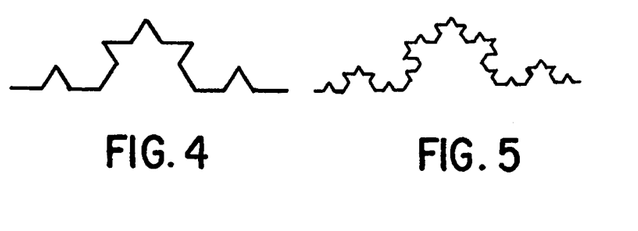

The present invention relates to a method for creating self-generating embroidery design patterns, such as preferably geometric patterns, with a conventional embroidery CAD system, such as PG1, based on the mathematical principle of fractal geometry. Fractal geometry involves sets of points that are generated by relatively simple calculations repeated over and over, feeding the results of each step back into the next. There are many categories of fractals each of which can be manipulated in a virtually infinite number of ways. A good example of a fractal is represented by the von Koch snowflake illustrated in FIG. 2. As noted in *Computer Graphics: Principles and Practice*, 2nd Ed., at page 1020, in describing a fractal such as shown in FIG. 2, starting with a line segment with a bump on it as shown in FIG. 2, each segment of the line is replaced by a figure exactly like the original line, and the process is repeated. If it is repeated infinitely many times, the result is said to be self-similar. The entire object is similar, i.e., can be translated, rotated, and scaled, to a subportion of itself. In this regard, as illustrated in FIG. 2, 4 and 5 in constructing the von Koch snowflake, each segment in FIG. 2 is replaced by an exact copy of the entire figure, shrunk by a factor of 3, with the same process being applied to generate the figures shown in FIGS. 4 and 5.

Figure 3:
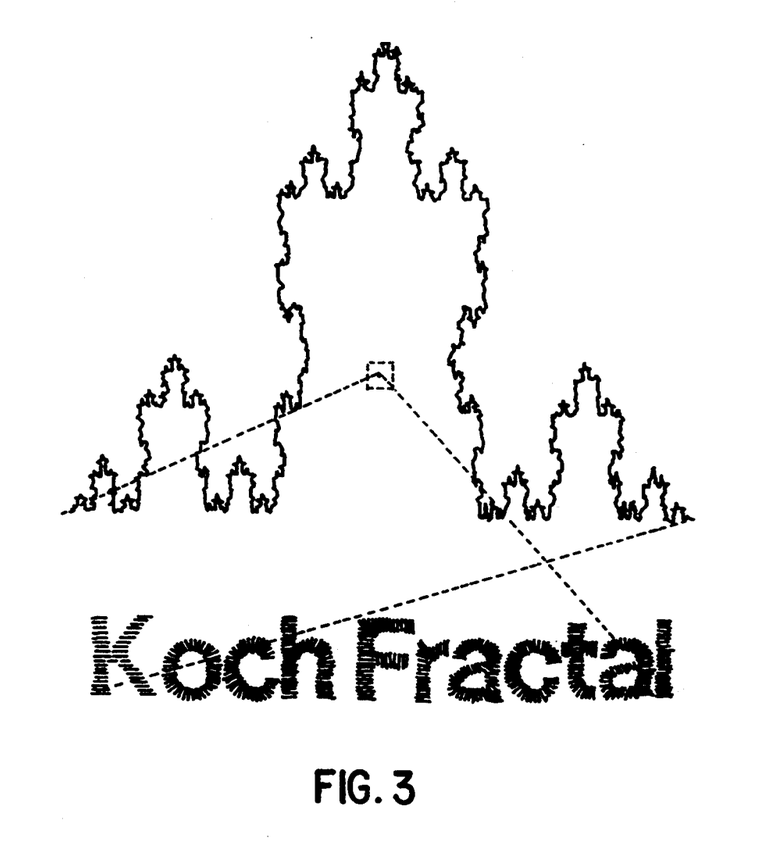
FIG. 3 is a diagrammatic illustration of a typical merged embroidery pattern producible in accordance with the presently preferred method of the present invention.

In accordance with the presently preferred method, once the coordinates of the fractal shape have been determined, these points are converted to embroidery outline and stitch data. These stitch points may, if desired, be merged with an existing embroidery design to produce a composite pattern, such as illustrated in FIG. 3. All of the resulting stitch points, whether merged or not, are preferably converted to stitch data, with the stitch points preferably being scaled up or down to fit a user defined finished embroidery size, with a user defined stitch length, such as for example 2 mm, preferably being utilized as the maximum stitch length and any line segment longer than that length preferably being broken up into smaller stitches. Preferably, actual conventional embroidery machine language codes are generated for each stitch for use in conventionally controlling the embroidery machine. The design is preferably stored in outline data form for ease of editing, such as described in our aforementioned copending patent application incorporated by reference herein.

Figure 1:
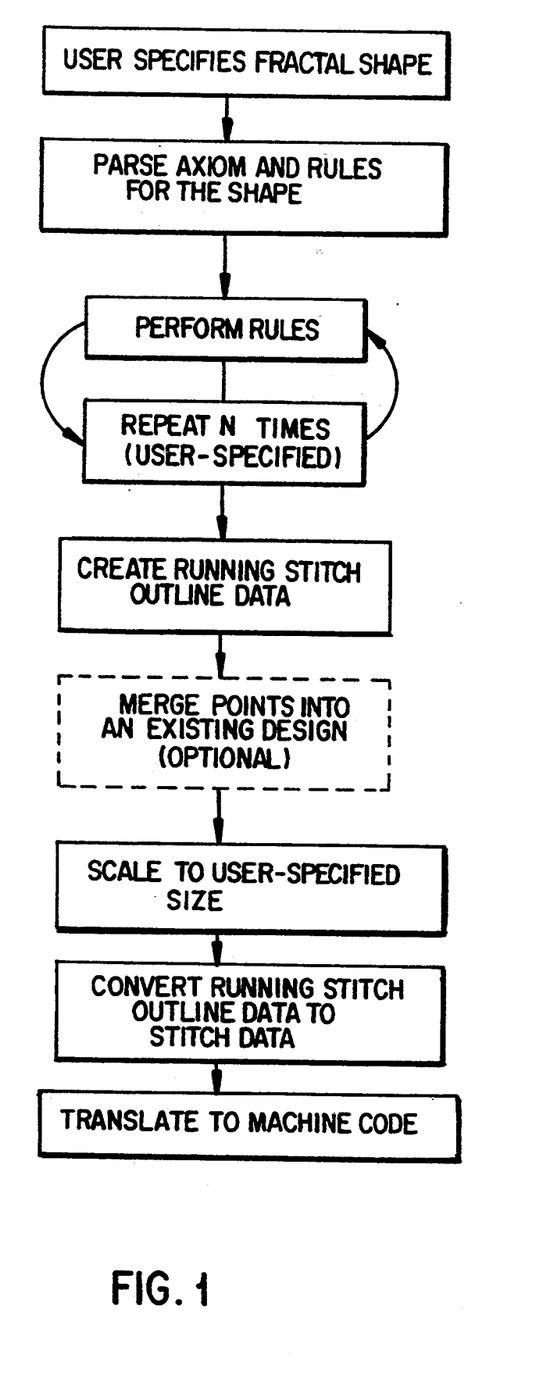
FIG. 1 is diagrammatic illustration of a flow diagram of the presently preferred method of the present invention.

FIG. 1 illustrates a presently preferred flow diagram of the method of the present invention. As illustrated in FIG. 1, the user specifies a desired fractal shape, such as by selecting one from memory or by defining a new one. The axiom, which is a first string consisting of only a few characters, and the associated production rules for the defined fractal shape, is then parsed, the rules performed and repeated n user specified times. Thereafter, the stitch points are preferably created in running stitch outline data format, which is one of the outline data formats described in the aforementioned copending patent application. If this is to be merged with an existing embroidery pattern design, such as illustrated in FIG. 3, then these stitch points in outline data format are merged with the stitch points associated with the existing pattern also in outline data format. The resultant pattern, in either instance, is then preferably scaled to a user defined size, and then the running stitch outline data is converted to stitch data. The resultant stitch data is then preferably translated into machine language code depending on the associated embroidery machine to be controlled.

In order to further explain the process of converting the running stitch outline data into stitch data, the following explanation is provided. By way of example, the associated program is written in C and compiled with Borland C++ version 3.1 for MS-DOS systems and may be run on any PC compatible 386 or better machine, such as an 80486DX2 machine running at 66 Mhz. Outline data consists of "segments" or groups of points (cartesian coordinates). Each segment has certain characteristics, including, among others: (a) the type of stitch to be created (eg. Run, Satin, Fill, etc.); and (b) in the case of a Run stitch-type segment, the maximum stitch length. As an example, let's suppose the maximum stitch length has been specified to be 2 millimeters. Each segment is examined in turn ("looped"). The points in the segment are scaled up or down in order to have the entire design (ie. all the segments together) fill a user-defined finished embroidery size. For example, if all the segments together fill a space that is 100 units wide, by 200 units high, but the user has requested that the design be 20 millimeters wide by 40 mm. high, then all the points are scaled accordingly (in this case, divided by 5 in the x and y components). Each outline point in the segment being examined is then looped through. The system then creates stitch data: going from one point in the segment to the next is performed by creating a number of actual stitches, none of which is longer than the maximum specified for the segment (in our example, 2 mm.). If the scaled distance from the first point to the next is, for example, 20 mm, then 10 stitches, each 2 mm long will be created, spaced evenly along the line joining the two outline points. If the distance between the points is not an even multiple of the maximum length, then the system either spaces the stitches evenly throughout the line, with none of the stitches exceeding the defined maximum length, or it creates stitches of the defined length, and then one "leftover" stitch. For example, if the length of the line is 5 mm, and the maximum stitch length is 2 mm, then either 3 stitches of approximately 1.67 mm each are created, or 3 stitches of length 2, 2 and 1 respectively are created. The choice of these two methods is a user-specified option. The resulting stitch data is stored in stitch data format. For it to be used on an embroidery machine, the stitch data is then converted to actual embroidery machine language codes, with the language code used depending on the user's selection. Below, in the following Table, is a typical preferred program listing in C-language which corresponds on the flow chart of FIG. 1 to the functions associated with the steps of creating the running or Run stitch outline data, parsing, and performing the rules. The first function called is lsysmain(). This is called with the user-specified fractal shape ("filename"). This is at the end of this listing. The parsing of the axiom and rules is performed in that function. The "loop" of performing the Rules "n" times is done in makeString(). The creation of a Running Stitch Outline Point is performed by calling doAddPoint(), with the specification of the cartesian coordinates to be created.

TABLE

```
#include <stdio.h>
#include "lsysdraw.h"
#include "pg2calls.h"

double llx, lly, urx, ury;
#define SCREEN_WIDTH 640.0
define SCREEN_HEIGHT 480.0 int doortho(double x1, double x2, double y1, double y2)
{
    // set up scaling so that stitches will fill the area given
    llx = x1;
    lly = y1;
    urx = x2;
    ury = y2;
    return 0;
} define TX(x) ((double)10.0*((x - llx)*SCREEN_WIDTH / (urx - llx)))
define TY(y) ((double)10.0*(SCREEN_HEIGHT - ((y - lly)*SCREEN_HEIGHT / (ury - lly))))
```

```c
int segstarted = -1;
extern long nps;
int domove(double x, double y)
{
    if (segstarted > -1)
        cleanup();
    segstarted = 1;

// start a new segment
    startcomplex();
    // set up segment
    setupSegment(RUNSTITCH);

// insert first point
    doAddPoint(TX(x), TY(y));
    return 0;
} int dodraw(double x, double y)
{
    static int countpoints = 0;

countpoints++;
    if (countpoints > 1500)
        {
        // can't have more than 1500 points in one run segment,
        // break it into two segments
        doAddPoint(TX(x), TY(y));
        domove(x, y);
        countpoints = 0;
        }
    else
        doAddPoint(TX(x), TY(y));
    return 0;
} int cleanup()
{
    // do post-processing on the stitches
    finishSegment();
    endcomplex();
    segstarted = -1;

return 0;
}
```

```
#include <math.h>
#include <stdlib.h>
#include <stdio.h>
#include <string.h>
#include <malloc.h>
#include "plsys.h"
#include "lsysdraw.h"

define PI      3.141592654 define MAX_RULE_LENGTH 80
define MAX_RULES 80
#define MAX_DIRS 360

// tables for cos and sin (for speed reasons)
// assume no more than MAX_DIRS directions will be wanted
double COStab[MAX_DIRS];
double SINtab[MAX_DIRS];

char axiom[MAX_RULE_LENGTH];

// Kar[i] is the left side of the production rule
char Kar[MAX_RULES];
// Rule[i] is the right side
char Rule[MAX_RULES][MAX_RULE_LENGTH];
int num = 0;            /* number of rules */
int dirs;               /* number of possible directions */
int cdir;               /* current direction */
double cx, cy;          /* current x and y */

// We need a stack for implementing save/restore position for complex curves
// like bushes struct doublenode
    {
    double x;
    struct doublenode *next;
    } stack;
struct doublenode *top;

double push(double x)
    {
    struct doublenode *otop;
    otop = top;
```

```
top = (struct doublenode *) malloc(sizeof(struct doublenode));
top->x = x;
top->next = otop;
return x;
} double pop(double *x)
  {
  struct doublenode *otop;

*x = top->x;
  otop = top;
  top = top->next;
  if (otop)
      free(otop);
  return *x;
  }

// makeString does all the work to compute the fractal
int makeString(int level, FILE **s)
  {
  int currentLevel;
  int command;
  int i, k;
  FILE *str;

// initialize the fractal with the axiom string
  str = fopen("tempfile.0ls", "w");
  fwrite(axiom, strlen(axiom), 1, str);
  fclose(str);

for (currentLevel = 0; currentLevel < level; currentLevel++)
      {
      str = fopen("tempfile.0ls", "r");
      *s = fopen("final.0ls", "w");

// search through the fractal making substitutions for each
         // character
         while ((command = fgetc(str)) != EOF)
            {
            for (i = 0; (i < num) && (command != Kar[i]); i++)
               ;
            if (i < num && command == Kar[i])
               fwrite(Rule[i], strlen(Rule[i]), 1, *s);
            }              /* end for */
```

```
            fclose(str);
            fclose(*s);
            unlink("tempfile.0ls");
            rename("final.0ls", "tempfile.0ls");
        }                    /* end for */

// return the generated fractal
    *s = fopen("tempfile.0ls", "r");
    return 0;
    }                        /* makeString */ int doMove(char c)
    {
    double tdir;

// interpret this character of the fractal string into a movement
    switch (c)
        {
        case 'f':                case 'f':
        case 'F':                case 'F':
            cx += COStab[cdir];
            cy += SINtab[cdir];
            break;
        case '+':
            cdir--;
            if (cdir < 0)
                cdir = dirs - 1;
            break;
        case '-':
            cdir++;
            cdir %= dirs;
            break;
        case '|':
            cdir = cdir + dirs / 2;
            cdir %= dirs;
            break;
        case '[':
            push((double) cx);
            push((double) cy);
            push((double) cdir);
            break;
        case ']':
            pop(&tdir);
            cdir = (int) tdir;
```

```
        pop(&cy);
        pop(&cx);
    default:
        break;
    }                   /* end switch */
    return 0;
}                       /* move */ int getCurveSize(FILE **str, double *xmin, double *xmax, double *ymin, double *ymax)
{
int i;
int c;

for (i = 0; i < dirs; i++)
    {
    COStab[i] = cos((double) ((double) (2 * PI * i) / (double) (dirs)));
    SINtab[i] = sin((double) (2 * PI * i) / (double) dirs);
    }
cdir = 0;
cx = cy = 0.0;
*xmax = *xmin = *ymax = *ymin = 0;

// walk through the fractal to find max/min points
fseek(*str, 0, SEEK_SET);
while ((c = fgetc(*str)) != EOF)
    {
    doMove(c);
    if ( c == 'f' || c == 'F' )
        {
        *xmax = cx > *xmax ? cx : *xmax;
        *xmin = cx < *xmin ? cx : *xmin;
        *ymax = cy > *ymax ? cy : *ymax;
        *ymin = cy < *ymin ? cy : *ymin;
        }               /* end if */
    }                   /* end for */
return 0;
}                       /* getCurveSize */ interpret(FILE **str, double xmin, double xmax, double ymin, double ymax)
{
int i;
int c;

// scale to fit the box
doortho(xmin - 0.5, xmax + 0.5, ymin - 0.5, ymax + 0.5);
```

```
cdir = 0;
cx = cy = 0.0;
domove(cx, cy);

// stitch the fractal
fseek(*str, 0, SEEK_SET);
while ((c = fgetc(*str)) != EOF)
   {
   doMove(c);
   if (c == 'F')
      dodraw(cx, cy);
   else if (c == 'f' || c == 'J')
      domove(cx, cy);
   }                /* end for */
cleanup();
return 0;
}                   /* interpret */ int plotLsystem(int level)
   {
   double xmin, ymin, xmax, ymax;
   FILE *str;

// make the fractal
   makeString(level, &str);
   // find out how big it is
   getCurveSize(&str, &xmin, &xmax, &ymin, &ymax);
   // stitch it
   interpret(&str, xmin, xmax, ymin, ymax);

fclose(str);
   return 0;
   } void addrule(char LHS, char *RHS)
   {
   Kar[num] = LHS;
   strcpy(Rule[num], RHS);
   num++;
   } int lsysmain(long argc, char *filename)
   {
   int level = argc;
```

```
char lhs, rule[MAX_RULE_LENGTH];
char junk[10];

top = 0;

// read in the axiom and rules for this fractal
// from the fractal input file
{
FILE *input = fopen(filename, "r");
fscanf(input, "%d\n", &dirs);
fgets(axiom, sizeof(axiom), input);
fgets(rule, sizeof(rule), input);
lhs = rule[0];
while (lhs != '*')
    {
    addrule(lhs, (char *) (rule + 6));
    fgets(rule, sizeof(rule), input);
    lhs = rule[0];
    }
fclose(input);
}

// create the fractal
plotLsystem(level);

return 0;
}
```

NY31344

By utilizing the method of the present invention, self-generating embroidery patterns based on fractal geometry designs, may readily be provided either alone or integrated with existing designs, for enhancing the flexability and utility of the embroidery machines which are being controlled. Thus, additional other embodiments of the presently preferred method of the present invention may occur to those of ordinary skill in the art.

What is claimed is:

1. A method for creating a self-generating embroidery design pattern comprising the steps of:
defining a predetermined fractal shape having an associated axiom and production rules;
parsing said axiom and production rules associated with said defined fractal shape and performing said production rules a selectable predetermined number of times for providing a plurality of stitch or outline points in accordance with a desired finished embroidery design pattern size, said stitch points being in either an outline data format or a stitch data format;
converting said outline data format into a stitch data format; and translating said stitch data format into a predetermined embroidery language machine code for controlling an associated embroidery machine responsive to said predetermined embroidery language machine code whereby said associated embroidery machine may provide said desired finished embroidery design pattern as a self-generating pattern based on fractal geometry.

2. A method in accordance with claim 1 further comprising the step of scaling said plurality of stitch points from said defined fractal shape in accordance with a finished embroidery size.

3. A method in accordance with claim 2 further comprising the step of storing said outline data format for facilitating editing of said stitch data.

4. A method in accordance with claim 2 further comprising the step of defining a predetermined maximum stitch length, and breaking any line segment in said self-generating embroidery design pattern longer than said maximum stitch length into smaller stitches having a stitch length less than said maximum stitch length.

5. A method in accordance with claim 1 further comprising the step of defining a predetermined maximum stitch length, and breaking any line segment in said self-generating embroidery design pattern longer than said maximum stitch length into smaller stitches having a stitch length less than said maximum stitch length.

6. A method in accordance with claim 1 further comprising the steps of providing an existing embroidery design comprising a plurality of stitch points in an outline data format and merging said stitch points associated with said defined fractal shape in said outline data format with said stitch points associated with said existing embroidery design in said outline data format for creating a composite embroidery design pattern in an outline data format comprising merged stitch points.

7. A method in accordance with claim 6 wherein said converting step further comprises the step of converting said merged stitch points in said outline data format into a composite stitch data format.

8. A method in accordance with claim 1 wherein said parsing step for providing a plurality of stitch points comprises the step of creating said stitch points in a running stitch outline data format.

9. A method in accordance with claim 8 further comprising the step of scaling said plurality of stitch points from said defined fractal shape in accordance with a desired finished embroidery size.

10. A method in accordance with claim 8 further comprising the steps of providing an existing embroidery design comprising a plurality of stitch points in an outline data format and merging said stitch points associated with said defined fractal shape in said outline data format with said stitch points associated with said existing embroidery design in said outline data format for creating a composite embroidery design pattern in an outline data format comprising merged stitch points.

11. A method in accordance with claim 10 wherein said converting step further comprises the step of converting said merged stitch points in said outline data format into a composite stitch data format.

* * * * *

UNITED STATES PATENT AND TRADEMARK OFFICE
CERTIFICATE OF CORRECTION

PATENT NO. : 5,430,658

DATED : July 4, 1995

INVENTOR(S): AARON M. DIVINSKY, et al.

It is certified that error appears in the above-identified patent and that said Letters Patent is hereby corrected as shown below:

In Column 19, line 9: Insert --desired-- before "finished"

Signed and Sealed this

Fifth Day of December, 1995

Attest:

BRUCE LEHMAN

Attesting Officer

Commissioner of Patents and Trademarks